(12) United States Patent
Nishigaki et al.

(10) Patent No.: US 12,093,736 B2
(45) Date of Patent: Sep. 17, 2024

(54) PIPELINE COMPUTING APPARATUS, PROGRAMMABLE LOGIC CONTROLLER, AND PIPELINE PROCESSING EXECUTION METHOD

(71) Applicant: OMRON Corporation, Kyoto (JP)

(72) Inventors: Koji Nishigaki, Kusatsu (JP); Takaya Shimizu, Kyoto (JP); Takenori Kusaka, Kyoto (JP)

(73) Assignee: OMRON Corporation, Kyoto (JP)

( * ) Notice: Subject to any disclaimer, the term of this patent is extended or adjusted under 35 U.S.C. 154(b) by 534 days.

(21) Appl. No.: 17/439,821

(22) PCT Filed: Mar. 9, 2020

(86) PCT No.: PCT/JP2020/009930
§ 371 (c)(1),
(2) Date: Sep. 16, 2021

(87) PCT Pub. No.: WO2020/189360
PCT Pub. Date: Sep. 24, 2020

(65) Prior Publication Data
US 2022/0179708 A1    Jun. 9, 2022

(30) Foreign Application Priority Data

Mar. 20, 2019  (JP) .................................. 2019-053468

(51) Int. Cl.
*G06F 9/50*         (2006.01)
(52) U.S. Cl.
CPC .............. *G06F 9/5027* (2013.01); *G06F 9/50* (2013.01)

(58) Field of Classification Search
None
See application file for complete search history.

(56) References Cited

U.S. PATENT DOCUMENTS

| 2005/0188189 A1* | 8/2005 | Yeung ........................ G06F 9/50 713/1 |
| 2012/0079141 A1 | 3/2012 | Ushiku |

FOREIGN PATENT DOCUMENTS

| CN | 103677999 | 3/2014 |
| CN | 109324900 | 2/2019 |
| JP | H11237993 | 8/1999 |
| JP | 2004133577 | 4/2004 |
| JP | 2012073906 | 4/2012 |

(Continued)

OTHER PUBLICATIONS

Machine translation of JPH-11-237993 Aug. 31, 1999. (Year: 1999).*

(Continued)

*Primary Examiner* — Qing Yuan Wu
(74) *Attorney, Agent, or Firm* — JCIPRNET

(57) ABSTRACT

A pipeline computing apparatus (110) comprises: a computing unit (120) configured as a pipeline; a node monitoring unit (161) that obtains a node processing time; a queue monitoring unit (162) that obtains an accumulated message amount; a priority variable calculating unit (163) that, on the basis of the node processing time and the accumulated message amount in a reception queue in a stage previous to the node, calculates a priority variable of the node; and a time allocating unit (164) that allocates operating time to each of nodes in accordance with the priority variable.

17 Claims, 9 Drawing Sheets

(56) References Cited

FOREIGN PATENT DOCUMENTS

| | | |
|---|---|---|
| JP | 2017147869 | 8/2017 |
| KR | 20050060553 | 6/2005 |
| KR | 20080022079 | 3/2008 |
| WO | 2012169037 | 12/2012 |

OTHER PUBLICATIONS

"International Search Report (Form PCT/ISA/210) of PCT/JP2020/009930," mailed on Jun. 9, 2020, with English translation thereof, pp. 1-4.
"Written Opinion of the International Searching Authority (Form PCT/ISA/237) of PCT/JP2020/009930," mailed on Jun. 9, 2020, with English translation thereof, pp. 1-8.
Office Action of China Counterpart Application, with English translation thereof, issued on Nov. 9, 2023, pp. 1-20.
Office Action of Korea Counterpart Application, with English translation thereof, issued on Dec. 7, 2023, pp. 1-10.
"Search Report of Europe Counterpart Application", issued on Oct. 11, 2022, pp. 1-12.

\* cited by examiner

PIPELINE COMPUTING APPARATUS, PROGRAMMABLE LOGIC CONTROLLER, AND PIPELINE PROCESSING EXECUTION METHOD

CROSS-REFERENCE TO RELATED APPLICATION

This application is a 371 application of the International PCT application serial no. PCT/JP2020/009930, filed on Mar. 9, 2020, which claims the priority benefits of Japan Patent Application No. 2019-053468, filed on Mar. 20, 2019. The entirety of each of the above-mentioned patent applications is hereby incorporated by reference herein and made a part of this specification.

BACKGROUND

Technical Field

The invention relates to a pipeline computing apparatus, a programmable logic controller, and a pipeline processing execution method.

Description of Related Art

In factory automation (FA) at various production sites, there is an increasing demand for collecting sampling data related to operation information of various devices, measurement data of fluid products, and other production information, and creating a database. Therefore, in a production factory, it is required to improve the performance of a data collection and analysis system that can access various kinds of devices and handle a huge amount of data.

Pipeline processing is well known as a technology that enables an information processing apparatus to handle various data. Patent Document 1 discloses a method of adjusting an execution priority for each task and preventing overflow of a reception buffer (reception queue) to perform appropriate data processing in such pipeline processing.

RELATED ART

Patent Document

[Patent Document 1] Japanese Laid-Open No. H11-237993

SUMMARY

Problems to be Solved

The data collection and analysis system in FA needs to be configured so that the user (factory manager) can freely determine the data collection target device, data processing method, etc. according to the production process. It has been considered to use a pipeline computing apparatus as a data collection and analysis device for this purpose.

In the pipeline computing apparatus, by combining the data collection target device and the prepared functional blocks (nodes) corresponding to the desired data processing method, it is possible to easily set the data processing procedure required by the user.

Further, it is also conceivable to integrate the pipeline computing apparatus serving as a data collection and analysis device in a programmable logic controller (PLC) that controls various control target devices. As a result, it becomes easy to reflect the result of analyzing the collected data to the control for various control target devices.

Since the data to be handled by the pipeline computing apparatus for use in such FA is enormous, high performance is required.

The invention, in one aspect, realizes an improved pipeline computing apparatus that can efficiently execute pipeline processing as a whole while preventing overflow of a reception queue.

Means for Solving the Problems

In view of the above-mentioned problems, the invention adopts the following configuration.

A pipeline computing apparatus according to one aspect of the invention includes: a computing unit including a plurality of nodes and a plurality of reception queues, and the computing unit being composed of at least one of pipelines in which a plurality of the nodes are connected via the reception queues; and a control unit including a node monitoring unit, a queue monitoring unit, a priority variable calculating unit, and a time allocating unit. The node monitoring unit acquires a node processing time, which is a time required to process one message in the node, from the node. The queue monitoring unit acquires an accumulated message amount to the reception queue from the reception queue. The priority variable calculating unit calculates a priority variable of the node based on at least the node processing time of the node and the accumulated message amount of the reception queue in a stage previous to the node. The time allocating unit allocates an operating time to each node according to the priority variable for each node.

A programmable logic controller according to one aspect of the invention may include the pipeline computing apparatus according to the above one aspect.

A pipeline processing execution method according to one aspect of the invention is a method for executing pipeline processing by at least one pipeline in which a plurality of nodes are connected via a plurality of reception queues. The pipeline processing execution method includes: a step of acquiring a node processing time, which is a time required to process one message in the node; a step of acquiring an accumulated message amount to the reception queue; a step of calculating a priority variable of the node based on at least the node processing time of the node and the accumulated message amount of the reception queue in a stage previous to the node; and a step of allocating an operating time to each node according to the priority variable for each node.

Effects

According to the pipeline computing apparatus according to one aspect of the invention, improved pipeline computation can be realized, which can efficiently execute pipeline processing as a whole while preventing overflow of the reception queue.

According to the programmable logic controller according to one aspect of the invention, it is easy for the user to construct an FA system that has a high-performance data collection function and reflects the result of analyzing the collected data for control of various control target devices.

According to the pipeline processing execution method according to one aspect of the invention, improved pipeline computation can be realized, which can efficiently execute pipeline processing as a whole while preventing overflow of the reception queue.

DESCRIPTION OF THE EMBODIMENTS

First Embodiment

Hereinafter, an embodiment (hereinafter, also referred to as "the present embodiment") according to one aspect of the invention will be described with reference to the drawings.

1. Application Example

Figure 1:
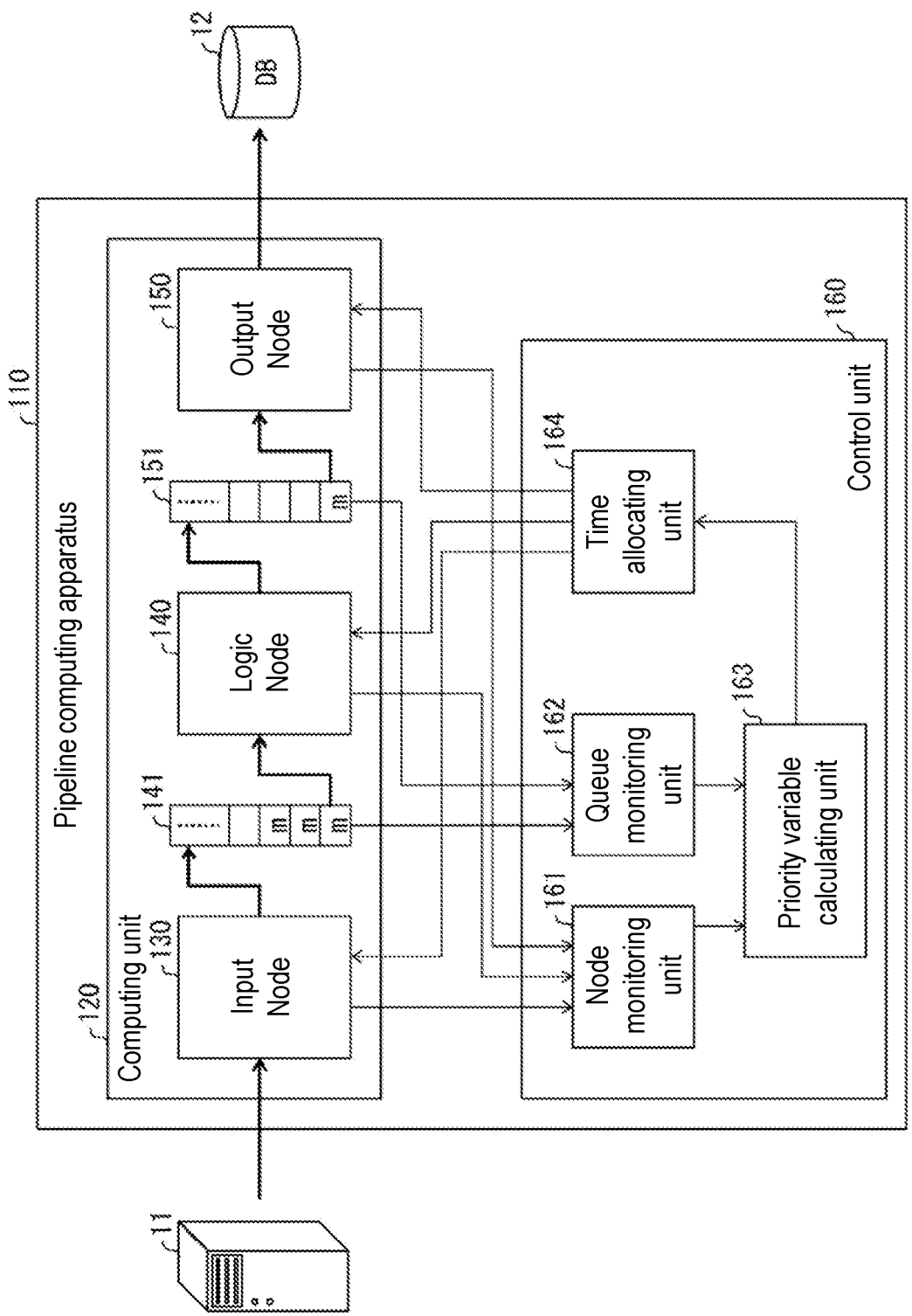
FIG. 1 is a schematic configuration diagram showing a pipeline computing apparatus according to the first embodiment of the invention.

First, an example of a situation in which the invention is applied will be described with reference to FIG. 1. FIG. 1 is a schematic diagram showing a configuration of a pipeline computing apparatus 110 according to the present embodiment.

The pipeline computing apparatus 110 includes a computing unit 120 and a control unit 160.

The computing unit 120 has a plurality of nodes (input node 130, logic node 140, and output node 150), which are functional blocks, and a plurality of reception queues 141 and 151. In the computing unit 120, a pipeline in which a plurality of the nodes are connected via the reception queues is configured, and the computing unit 120 is provided with at least one pipeline.

The control unit 160 has a node monitoring unit 161, a queue monitoring unit 162, a priority variable calculating unit 163, and a time allocating unit 164, which are functional blocks.

The pipeline computing apparatus 110 realizes the function of each of these units as a functional block by executing a pipeline processing execution program loaded from outside or loaded from a recording apparatus (not shown) provided therein.

The node monitoring unit 161 acquires a node processing time T, which is a time required for processing a message at the node, from each node (input node 130, logic node 140, and output node 150).

The queue monitoring unit 162 acquires accumulated message amount from the reception queues 141 and 151, respectively.

The priority variable calculating unit 163 calculates a priority variable PRI of the node based on at least the node processing time of the node and the accumulated message amount of the reception queue in a stage previous to the node.

The time allocating unit 164 allocates an operating time to each node according to the priority variable PRI for each node and operates the node.

In this way, the pipeline computing apparatus 110 of the present embodiment calculates the priority variable PRI based on at least the node processing time and the accumulated message amount of the reception queue, and allocates the operating time to each node accordingly.

Therefore, an improved pipeline computing apparatus that can efficiently execute pipeline processing as a whole while preventing overflow in the reception queue is realized.

2. Configuration Example

Subsequently, an example of the configuration of the pipeline computing apparatus 110 of the present embodiment will be described.

The node in the computing unit 120 is any one of the input node 130, the logic node 140, and the output node 150. The respective functions are as follows.

The input node 130 is a functional block that collects a message from an external device or the like of the pipeline computing apparatus 110. The input node 130 is diverse according to the type of the external device or the like and the type of the message to be handled. In the present specification, a set of data is referred to as a message, and the content of the message is information such as production information, control information, environmental information, etc. The control information can be information of a parameter such as real-time torque that can be acquired from a servomotor, and the environmental information can be information such as temperature.

The logic node 140 is a functional block that performs processing on the input message and outputs it to a subsequent stage. The logic node 140 is diverse according to the content of the processing to be executed.

The output node 150 is a functional block that outputs the input message to the external device or the like of the pipeline computing apparatus 110. The output node 150 is diverse according to the type of external device or the like and the type of the message to be handled.

The external device or the like of the pipeline computing apparatus 110 can be a database that collects and provides data related to machine tools, measuring devices, other various FA devices, and various production information, a database that stores data related various production information, and a cloud server on the Internet or other networks.

Further, when the pipeline computing apparatus 110 is integrated in a PLC, a connection destination of the input node 130 or the output node 150 of the pipeline computing apparatus 110 can also be an application such as a data file on a storage device included in the PLC or a motion control program of a machine tool operating on the PLC.

The production information is a concept that includes information related to the operation of machine tools, measuring devices, and other various FA devices, measurement data, and other information related to production.

FIG. 1 shows a data server 11 and a database 12 as examples of the external devices to which the input node 130 and the output node 150 are connected, respectively.

In the computing unit 120, the required logic node 140 is sequentially connected between the input node 130 and the output node 150 to form the pipeline.

The reception queue 141 of the logic node is provided in the stage previous to the logic node 140. Similarly, the reception queue 151 of the output node is provided in the stage previous to the output node 150. The reception queues 141 and 151 respectively temporarily accumulate the messages input to the logic node 140 and the output node 150 until the processing at the logic node 140 and the output node 150 is completed and the next message can be accepted.

The number of pipelines constituting the computing unit 120 is usually large, but may be at least one. In addition, the pipeline does not necessarily have one or more logic nodes connected in series from one input node 130 to one output node 150, and may branch or merge in the middle.

An outline of the configuration of the control unit 160 having the node monitoring unit 161, the queue monitoring unit 162, the priority variable calculating unit 163, and the time allocating unit 164 is as described in the above 1. Application example. Details of the function of each unit will be described later together with a description of the operation of the pipeline computing apparatus 110.

In the present embodiment, an accumulated message number Q, which is the number of messages, is adopted as the accumulated message amount of each reception queue.

Specifically, the node processing time T can be the following time from a start time to an end time. The start time can be a dequeue time of the reception queue, which is the time when the node receives the message from the reception queue. In the case of the input node 130, the time when the input node 130 starts (kicks) the execution can be set as the start time.

Further, the end time can be an enqueue time of the reception queue of the connection destination node, which is the time when the node sends the message to the reception queue of the connection destination node. In the case of the output node 150, it can be the time when the output of the message to the output destination external device or the like of the output node 150 is completed. Furthermore, especially when the node does not output the message in the subsequent stage, the time when the node that received the message no longer needs to perform processing related to the message received by the node (the time when the processing performed by itself is completed) may be set as the completion time.

3. Operation Example

The operation of the pipeline computing apparatus 110 of the present embodiment will be described based on a more specific example.

The input node 130 sequentially acquires messages from a plurality of data servers 11. Each of the data servers 11 can be a web server that provides the message based on Hypertext Transfer Protocol (http) and Hypertext Transfer Protocol Secure (https).

The logic node 140 sequentially extracts data required for analyzing the state of equipment, for example, from the input message, performs required computation, and outputs. The logic node 140 may perform processing using, for example, a HyperText Markup Language (html) analysis script.

The output node 150 sequentially outputs the message output by the logic node 140 to the database 12.

Figure 2:
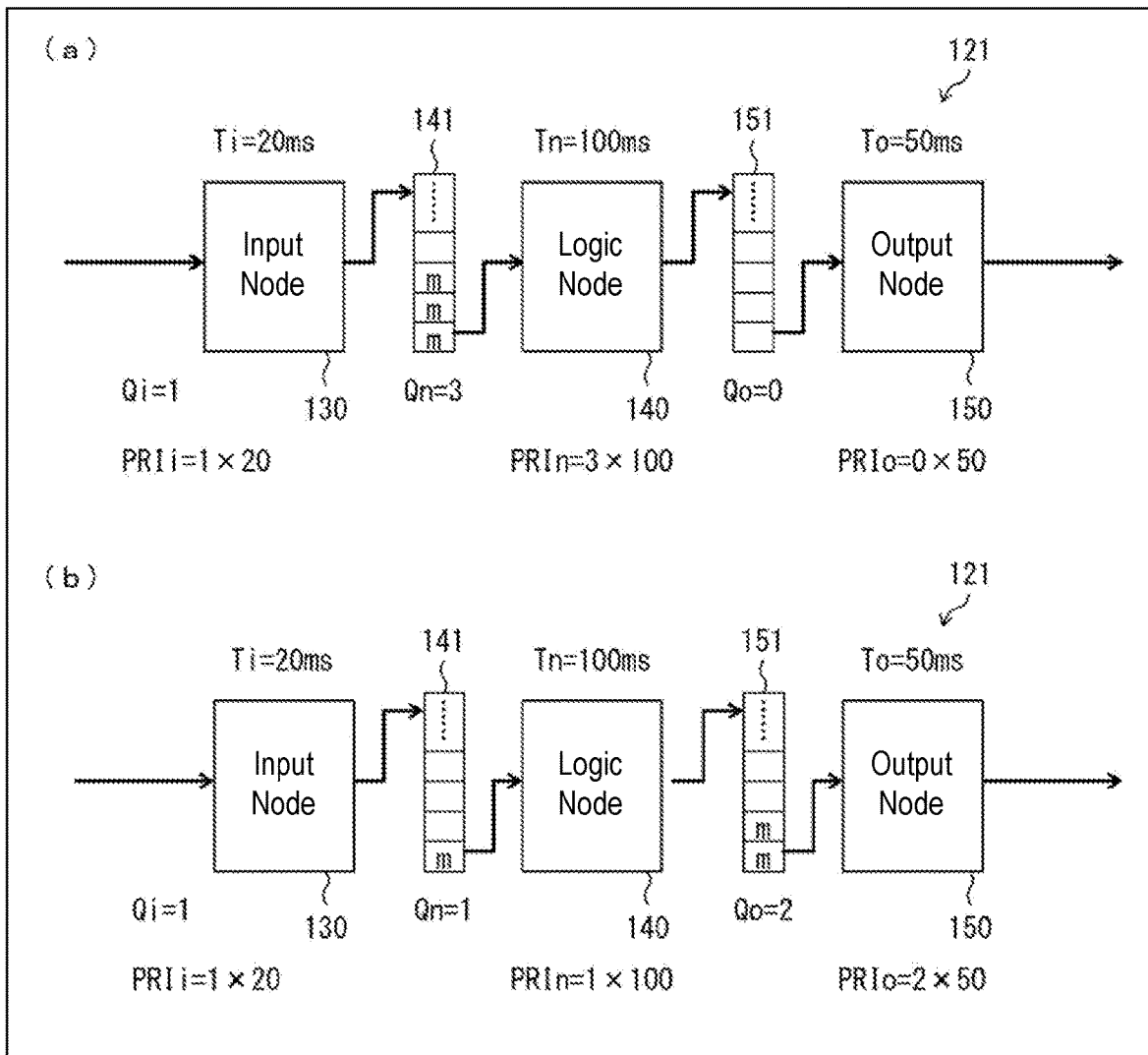
FIG. 2 is a diagram for illustrating an operation of the pipeline computing apparatus according to the first embodiment of the invention, wherein (a) and (b) show states at different times.

(a) of FIG. 2 is a diagram showing a state of the pipeline 121 in the computing unit 120 when each node executes such an operation. The subscripts i, n, and o for the node processing time T, the accumulated message number Q of the reception queue, and the priority variable PRI respectively represent the input node 130, the logic node 140 or its reception queue 141, and the output node 150 or its reception queue 151.

In this example, the node processing time T required for each node to process the message is Ti=20 ms, Tn=100 ms, and To=50 ms.

At this time, the node monitoring unit 161 acquires the node processing times Ti=20 ms, Tn=100 ms, and To=50 ms, respectively, from the input node 130, the logic node 140, and the output node 150. Although the unit is expressed as milliseconds here, it may be a clock number of a CPU (Central Processing Unit).

Further, the accumulated message number Q, which is the number of messages accumulated in each reception queue, is temporarily Qn=3 and Qo=0 in the state of (a) of FIG. 2.

At this time, the queue monitoring unit 162 acquires the accumulated message numbers Qn=3 and Qo=0 from the reception queues 141 and 151, respectively.

Next, the priority variable calculating unit 163 receives the node processing time T of each node from the node monitoring unit 161 and the accumulated message number Q of each node from the queue monitoring unit 162. Further, the priority variable calculating unit 163 considers the accumulated message number Qi to be 1 with respect to the input node 130.

Then, the priority variable calculating unit 163 calculates the priority variable PRI with respect to each node. Here, the priority variable PRI is a value calculated from at least the node processing time T and the accumulated message number Q. In a specific example of the present embodiment, the priority variable PRI is a product of the node processing time T and the accumulated message number Q.

The priority variable calculating unit 163 calculates the priority variable PRI with respect to each node as PRIi 1=1×20, PRIn=3×100, and PRIo=0×50.

Subsequently, the time allocating unit 164 allocates information processing resources with respect to the time given to the computing unit 120, for example, CPU time, according to the priority variable PRI with respect to each node calculated by the priority variable calculating unit 163. As an example, the CPU time given to the computing unit 120 is apportioned by the priority variable PRI to operate each node.

Then, within a predetermined time from the state of (a) of FIG. 2, the output node 150 is not allocated the CPU time, and the logic node 140 is allocated a larger CPU time than the input node 130.

Since a large CPU time is allocated to the logic node 140, after a certain time elapses, the accumulated message number Qn of the reception queue 141 of the logic node 140 decreases, and the state transitions to the state shown in (b) of FIG. 2 as an example. In this way, the accumulation of messages sent by the input node 130 to the logic node 140 is resolved.

However, when fixed-cycle execution is reserved for the input node 130, the time allocating unit 164 exceptionally gives the input node 130 a CPU time during which the fixed-cycle execution of the operation can be performed.

An operation of the time allocating unit 164 when the fixed-cycle execution is reserved for the input node 130 is as follows. For example, when a reservation is made to acquire a message from the external device at a fixed cycle of 1 ms and the processing time of the input node 130 is 0.02 ms, the time allocating unit 164 operates the input node 130 so as to secure 0.02 ms of CPU time within at least 1 ms. The time allocating unit 164 apportions the remaining CPU time given to the computing unit 120 by the other nodes to operate each of the other nodes.

When the fixed-cycle execution is reserved for the input node 130 and a relatively large constant CPU time is allocated to the input node 130, the message from the input node 130 is output at a high frequency. Then, messages tend to accumulate in the reception queue of a specific node in the initial stage of the operation of the pipeline, but even in this case, the operating time of each node is adjusted in the same manner as described above, and the accumulation is resolved.

4. Function and Effect

As described above, even if messages are excessively accumulated in a specific reception queue temporarily, the pipeline computing apparatus 110 of the present embodiment operates so as to dynamically allocate the operating time according to the situation and resolve the excessive accumulation. Therefore, the overflow of the reception queue in the pipeline computation is effectively suppressed.

Further, as described above, the priority variable PRI is calculated from the node processing time T and the accumulated message number Q, and the operating time of each node is dynamically allocated according to the priority variable PRI. In other words, in the pipeline computing apparatus 110 of the present embodiment, the efficiency of the entire pipeline is improved with no operation waiting at the node.

(First Comparison)

For comparison, a case where the operating time of each node is not adjusted as described above by the control unit 160 will be described.

In this case, for example, when the processing of the message at the logic node 140 takes time, the messages output from the input node 130 accumulate in the reception queue 141 of the logic node 140 (Qn becomes excessive). If such a situation continues, the reception queue 141 will overflow.

Therefore, in order to avoid overflow, it is conceivable to provide a waiting time for the operation of the input node 130. For example, when the node processing time of the logic node 140 is Tn=100 ms, the waiting time for the operation of the input node 130 is set to 200 ms so that messages are sent to the reception queue 141 of the logic node 140 only at a time interval of 200 ms or more. It is required to design such a waiting time in consideration of the processing time in the subsequent stage of the pipeline.

However, when a large number of pipelines are set in the computing unit 120, it is very troublesome for the user to make such an adjustment, and it is also difficult to set the waiting time appropriately.

On the other hand, in the pipeline computing apparatus 110 of the present embodiment, the accumulation of messages is dynamically resolved even if the user does not make such an adjustment for each input node.

Therefore, it is not required for the user to set a parameter such as the waiting time of each node, making it possible to easily construct a data collection system capable of collecting and analyzing data from various devices.

(Second comparison)

Further, for comparison, a case in which the conventional technology of Patent Document 1 is applied will be described. In a pipeline computing apparatus to which the conventional technology is applied, the operating time allocated to each node is calculated from the amount of data (memory usage amount of the message) accumulated in the reception queue of each node.

On the other hand, in the pipeline computing apparatus 110 of the present embodiment, the operating time allocated to each node is apportioned according to the priority variable PRI, which is the product of the accumulated data number Q, which is the accumulated message amount of the reception queue of each node, and the node processing time T.

Therefore, when messages are excessively accumulated in the reception queue of a certain node temporarily, the CPU time is allocated to the node in consideration of the node processing time. Therefore, according to the pipeline computing apparatus 110, the state of excessive accumulation of messages can be resolved faster than the conventional technology.

Further, for example, when a node having a node processing time of 100 ms and a node having a node processing time of 200 ms are connected, in order for a constant flow of messages to pass through the pipeline, the latter node needs to be allocated twice as much CPU time. Therefore, in the conventional technology, such an allocation is executed when twice as many messages as the reception queue of the former node are accumulated in the reception queue of the latter node.

On the other hand, in the pipeline computing apparatus 110 of the present embodiment, the numbers of messages accumulated in these nodes in order to execute such an allocation are the same. This is because the CPU time is allocated by the product of the accumulated message number Q and the node processing time T. As described above, according to the pipeline computing apparatus 110 of the present embodiment, there is little difference in the number of messages accumulated in the reception queue of each node in the operating pipeline 121. Therefore, even when the memory resources for configuring the reception queue are limited, the pipeline computing apparatus 110 can be operated efficiently.

In addition, as in the conventional technology, when the message amount accumulated in the reception queue varies, at a specific node, the messages to be processed may be exhausted, and an inefficient situation is likely to occur in which the node waits for reception until the next timing at which the operating time ratio is updated. However, in the pipeline computing apparatus 110 of the present embodiment, since such a situation is suppressed, the pipeline processing as a whole can be efficiently executed.

The above-mentioned function and effect related to the first embodiment are similarly exhibited in the following embodiments.

Second Embodiment

Other embodiments of the invention will be described hereinafter. For convenience of explanation, the same reference numerals are assigned to the components having the same functions as the components described in the above embodiment, and the description thereof is not repeated.

Figure 3:
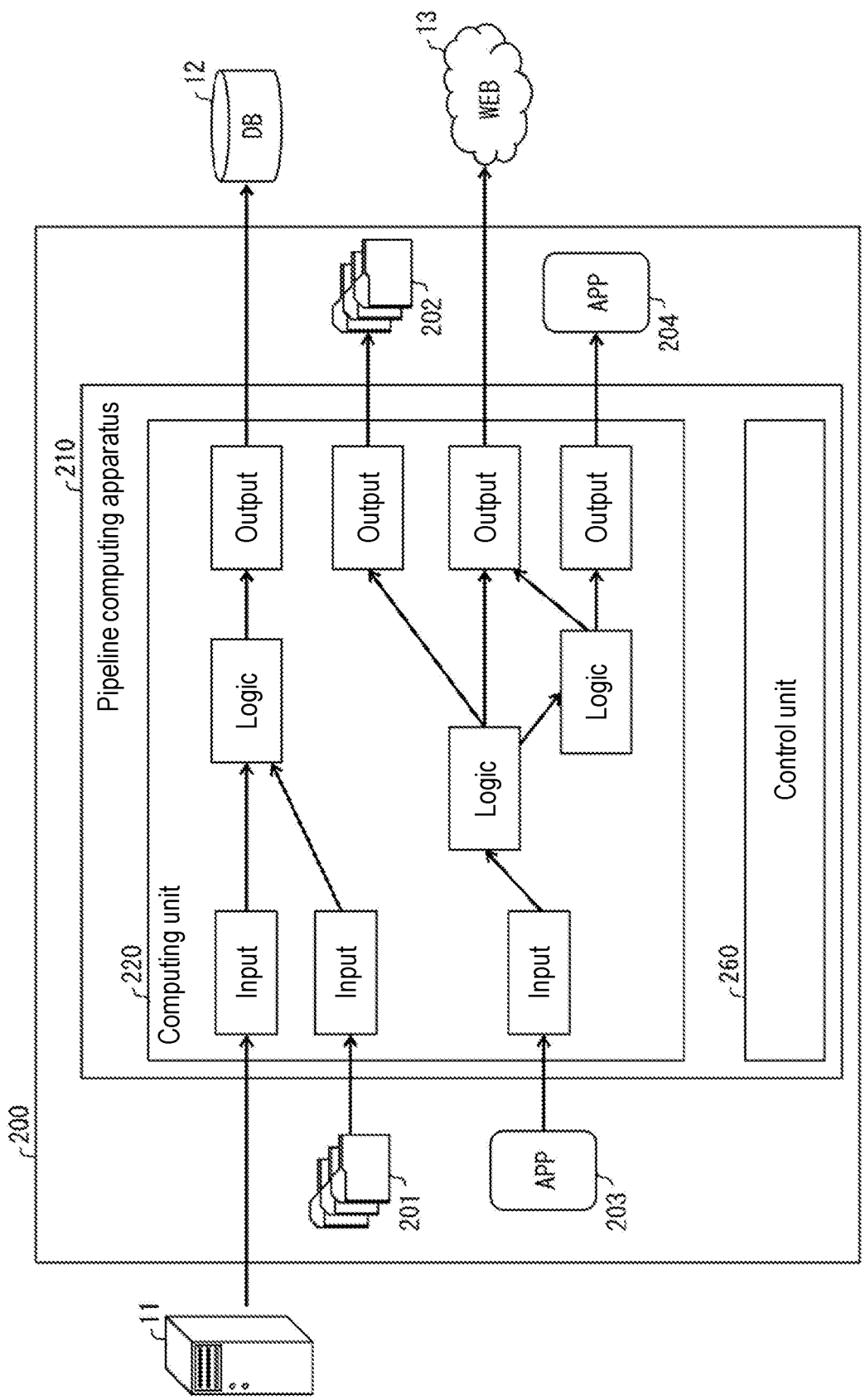
FIG. 3 is a schematic configuration diagram showing a programmable logic controller according to the second embodiment of the invention.

FIG. 3 is a schematic diagram showing a configuration of a programmable logic controller (PLC) 200 according to the second embodiment.

The programmable logic controller 200 includes the same pipeline computing apparatus 210 as in the first embodiment. The pipeline computing apparatus 210 is provided with a computing unit 220 and a control unit 260.

In the computing unit 220, the user (factory manager) constructs a pipeline that connects nodes corresponding to a data collection target device or the like, a data output target device or the like, and a data processing method, whereby the user can easily perform the required data collection and set the processing.

In FIG. 3, a plurality of pipelines composed of input nodes Input, logic nodes Logic, and output nodes Output are shown. Although not shown, a reception queue is connected to a stage previous to each of the logic nodes Logic and the output nodes Output as in the above embodiment. The control unit 260 has the same configuration as in the above embodiment.

The programmable logic controller 200 further has data files 201 and 202 in a storage device provided therein, and applications 203 and 204 such as motion control programs of machine tools that operate therein.

The connection destination of the input node Input of the pipeline computing apparatus 210 can be the data file 201 or the application 203. In addition, the connection destination of the input node Input can be a data server 11 that is an external device of the programmable logic controller 200 and collects and provides data related to machine tools, measuring devices, other various FA devices, and various production information, a database 12 that stores data related various production information, and a cloud server 13 on the Internet or other networks.

The connection destination of the output node Output of the pipeline computing apparatus 210 can be a data file 202 or an application 204. Further, the connection destination of the output node Output can be a data server 11 that is an external device of the programmable logic controller 200 and collects and provides data related to machine tools, measuring devices, other various FA devices, and FA devices, a database 12 that collects and provides data related various production information, and a cloud server 13 on the Internet or other networks.

The application 203 which is the connection destination of the input node Input and the application 204 which is the connection destination of the output node Output may be different applications or the same applications.

According to the second embodiment, the pipeline computing apparatus 210 serving as a data collection and analysis device is integrated in the programmable logic controller 200 that controls various control target devices. Therefore, it is easy for the user to construct a system that reflects the result of analyzing the collected data to the control of various control target devices.

Third Embodiment

The pipeline computing apparatus according to the third embodiment is the same as each of the above embodiments. In the third embodiment, an operation of the computing unit when a branch is set in the pipeline will be described.

Figure 4:
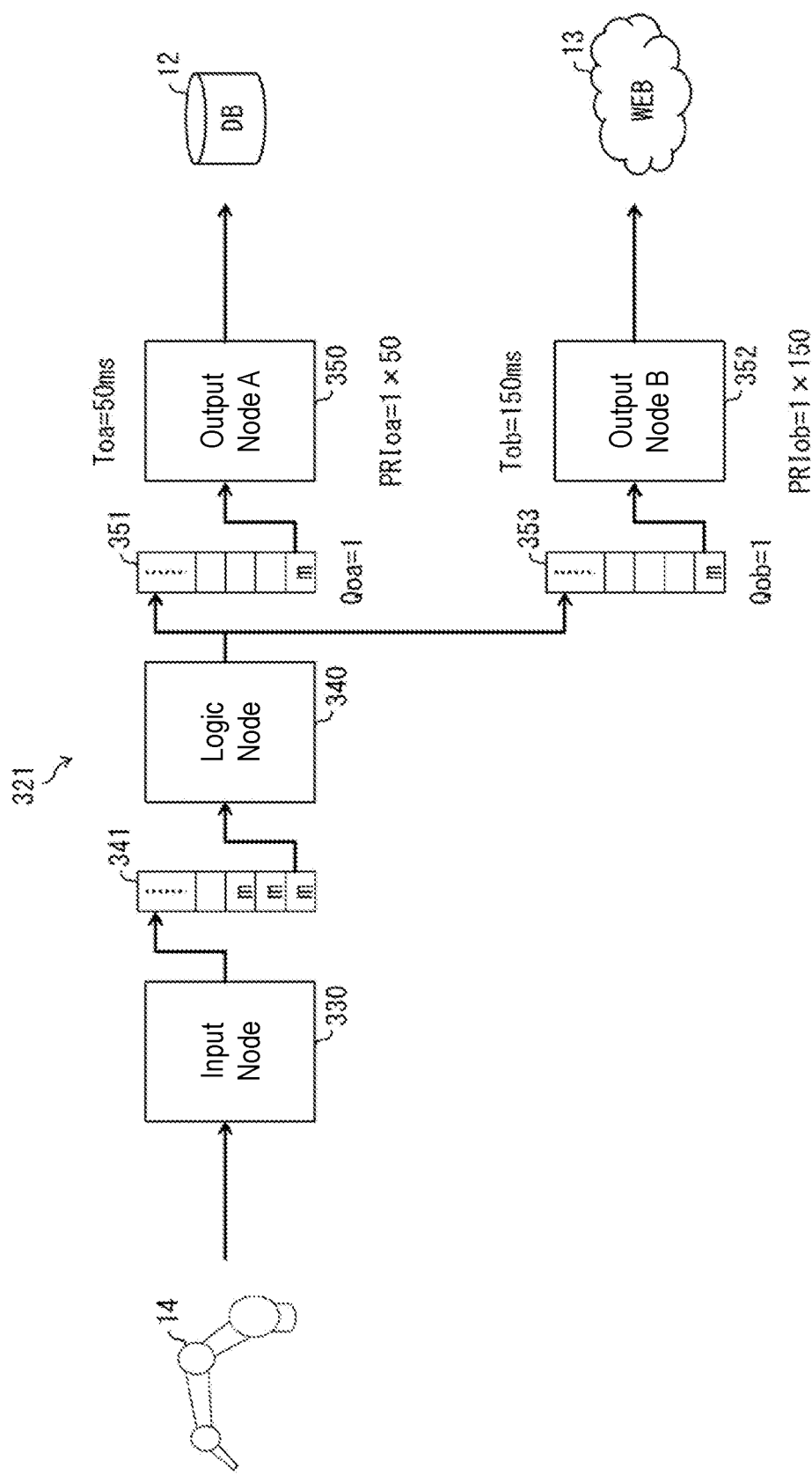
FIG. 4 is a diagram for illustrating a configuration and an operation of a pipeline in a pipeline computing apparatus according to the third embodiment of the invention.

FIG. 4 is a diagram showing a pipeline 321 belonging to the computing unit of the pipeline computing apparatus according to the third embodiment. The pipeline 321 has the following configuration.

An input node 330 acquires a message from a machine tool 14 outside the pipeline computing apparatus, and a logic node 340 extracts required data. A reception queue 341 is provided in a stage previous to the logic node 340. The logic node 340 branches and outputs the processed message to an output node (A) 350 and an output node (B) 352.

The output node (A) 350 outputs the processed message to the database 12 outside the pipeline computing apparatus. The output node (B) 352 outputs the message to the cloud server 13 outside the pipeline computing apparatus. The output node (B) 352 executes processing by, for example, a MQTT (Message Queuing Telemetry Transport) protocol.

Here, it is assumed that the node processing time Toa of the output node (A) 350 connected to the database 12 is 50 ms, and the output node (B) 352 connected to the cloud server 13 requires more time and the node processing time Tob is 150 ms. This corresponds to a case where the database 12 is connected to a local network inside a factory, and output processing is executed more quickly than for the cloud server 13 on the Internet.

When the operation of the pipeline 321 starts, a message is output from the logic node 340 to the reception queue 351 of the output node (A) 350 and the reception queue 353 of the output node (B) 352 almost at the same time. Then, both the accumulated message number Qoa of the reception queue (A) 351 and the accumulated message number Qob of the reception queue (B) 353 become 1.

Then, the ratio of the priority variable PRIoa=1×50 of the output node (A) 350 to the priority variable PRIob=1×150 of the output node (B) 352 becomes 1:3. Since the CPU time is allocated according to the ratio, the processing of the message in the output node (A) 350 and the output node (A) 350 ends almost at the same time.

Since the message processing ends almost at the same time in this way, the accumulated message number Qoa and the accumulated message number Qob are almost the same even after that, and the ratio of the CPU times given to the reception queue (A) 351 and the reception queue (B) corresponds to the node processing time. Accordingly, while the operation of the pipeline 321 continues, one of the output nodes 350 and 352 does not wait for message input and does not enter an operation idle state, and the CPU time is allocated to each node extremely efficiently.

On the other hand, in the case where the conventional technology of Patent Document 1 is applied, for example, when the operation of the pipeline starts and both the accumulated message number Qoa of the reception queue (A) 351 and the accumulated message number Qob of the reception queue (B) 353 become 1, the same CPU time is allocated. Thus, when the conventional technology of Patent Document 1 is applied, the output node (A) 350 which has a shorter node processing time waits for message input and enters an operation idle state, and the efficiency of the operation of the entire pipeline deteriorates.

As described above, in the example of the third embodiment, a pipeline computing apparatus that improves the efficiency of the pipeline as a whole without waiting for the operation at the node is realized.

Fourth Embodiment

The pipeline computing apparatus according to the fourth embodiment is the same as each of the above embodiments. In the fourth embodiment, an operation of the computing unit when a merger is set in the pipeline will be described.

Figure 5:
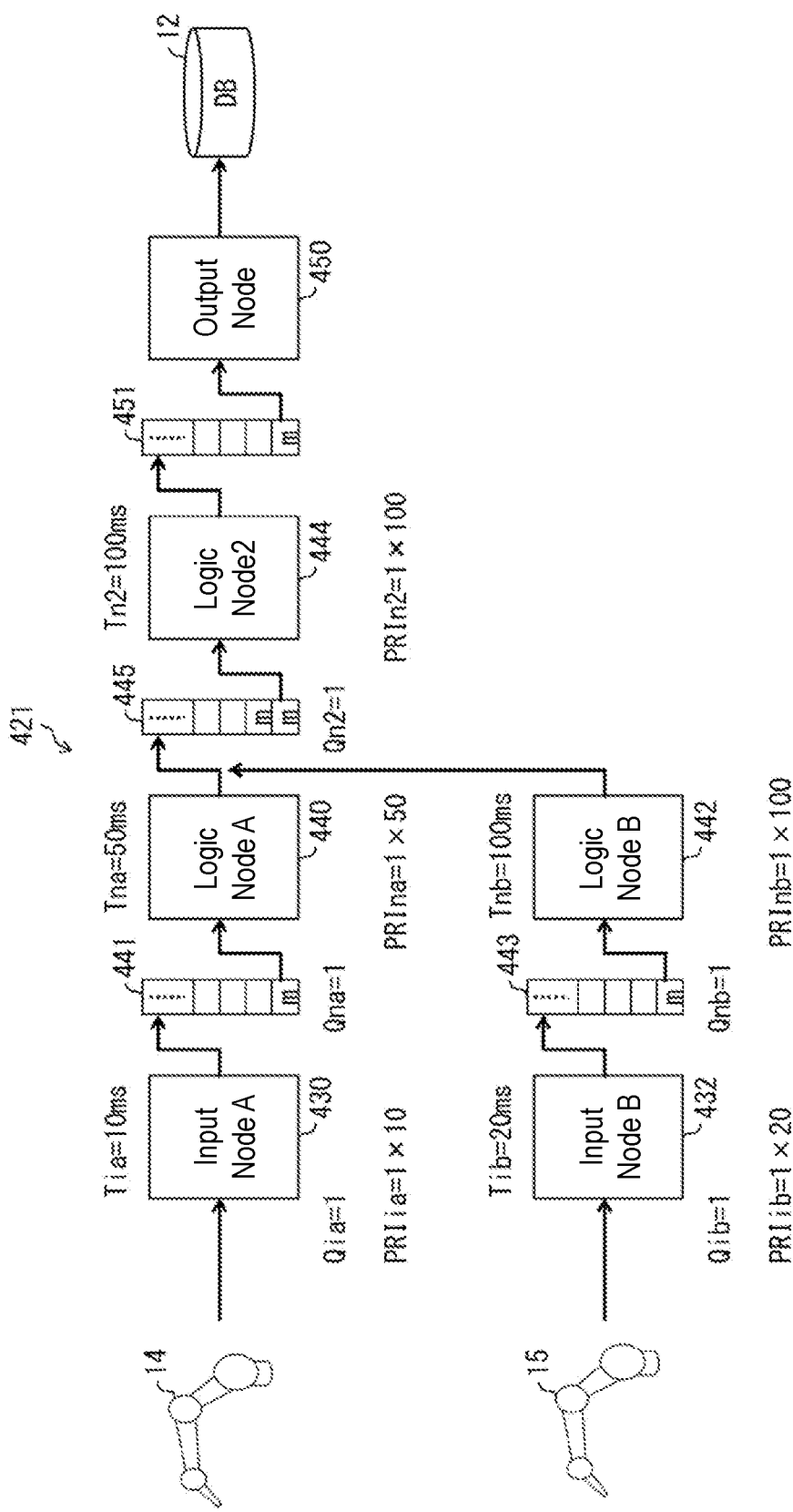
FIG. 5 is a diagram for illustrating a configuration and an operation of a pipeline in a pipeline computing apparatus according to the fourth embodiment of the invention.

FIG. 5 is a diagram showing a pipeline 421 belonging to the computing unit of the pipeline computing apparatus according to the fourth embodiment. The subscripts ia, ib, na, nb, and n2 for the node processing time T, the accumulated message number Q of the reception queue, the priority variable PRI respectively represent the input node (A) 430, the input node (B) 432, the logic node (A) 440 or its reception queue (A) 441, the logic node (B) 442 or its reception queue (B) 443, and the logic node (2) 444 or its reception queue (2) 445. The pipeline 421 has the following configuration.

The input node (A) 430 acquires a message from a machine tool 14 outside the pipeline computing apparatus, and the logic node (A) 440 extracts the required data. The reception queue (A) 441 is provided in a stage previous to the logic node (A) 440. The logic node (A) 440 enqueues the processed message into the reception queue (2) 445 of the logic node (2) 444.

The input node (B) 432 acquires a message from a machine tool 15 outside the pipeline computing apparatus, and the logic node (B) 442 extracts the required data. The reception queue (B) 443 is provided in a stage previous to the logic node (B) 442. The logic node (B) 442 enqueues the processed message into the reception queue 445 of the logic node (2) 444.

In this way, in the reception queue (2) 445 of the logic node (2) 444 where the pipelines merge, the accumulated message number Qn2 is counted with the messages from each node as one set.

The logic node (2) 444 dequeues both of the above messages from the reception queue 445, performs processing such as merging both messages, and outputs the same to the output node 450. The reception queue 451 is provided in a stage previous to the output node 450. The output node 450 outputs a message to the database 12 outside the pipeline computing apparatus.

Here, it is assumed that the node processing time Tna of the logic node (A) 440 is 50 ms and the node processing time Tnb of the logic node (B) 442 is 100 ms.

For each of the input nodes 430 and 432, if the allocation of the CPU time based on the priority variable PRI is executed, the processing of the message at each node can be completed in the same time as in the above embodiment.

Therefore, according to the fourth embodiment, the logic node (2) 444 at the merger point does not wait for input of any message and does not enter an operation idling state, and the CPU time can be allocated to each node extremely efficiently.

As described above, in the example of the fourth embodiment, a pipeline computing apparatus that improves the efficiency of the pipeline as a whole without waiting for the operation at the node is realized.

In FIG. 5, Qia=1, Qib=1, Qna=1, Qnb=1, Qn2=1, Tia=10 ms, Tib=20 ms, and Tn2=100 ms. Further, PRIia=1×10, PRIib=1×20, PRIna=1×50, PRInb=1×100, and PRIn2=1×100.

Fifth Embodiment

In the case where a merger from a plurality of input nodes is set in the pipeline as in the pipeline 421 of the pipeline computing apparatus according to the fourth embodiment, when a fixed-cycle execution is reserved for at least one input node, the following event occurs.

Since the time required to process messages differs between partial pipelines that merge, it results in a situation that while the messages from one partial pipeline accumulate in the reception queue (reception queue 445 in FIG. 5) of the node after the merger, the messages from the other partial pipeline are exhausted. Then, the node after the merger waits for messages, and the pipeline is not operated efficiently. The pipeline computing apparatus according to the fifth embodiment has a configuration capable of resolving such an event.

Figure 6:
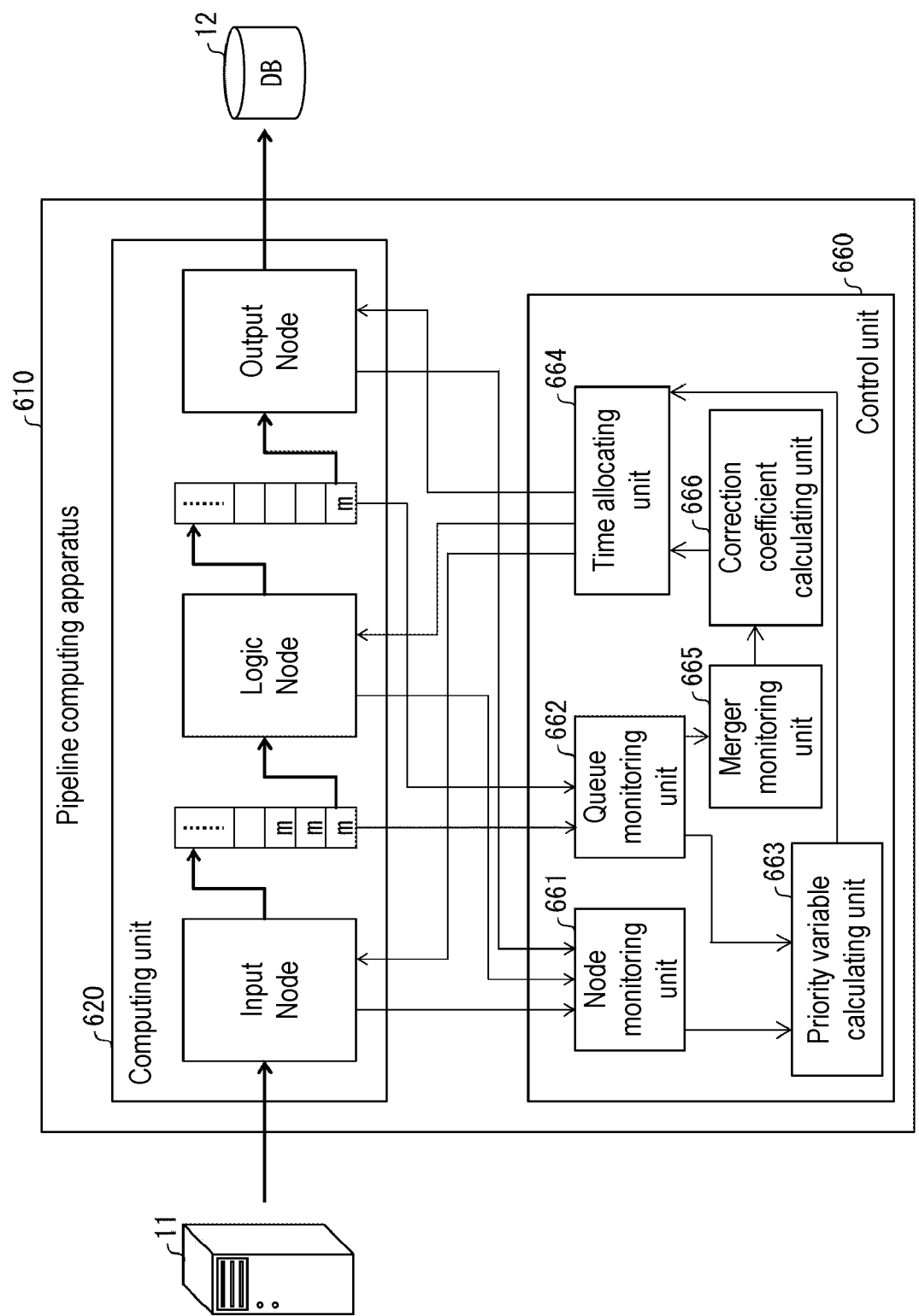
FIG. 6 is a schematic configuration diagram showing a pipeline computing apparatus according to the fifth embodiment of the invention.

FIG. 6 is a schematic diagram showing a configuration of a pipeline computing apparatus 610 according to the fifth embodiment.

The pipeline computing apparatus 610 includes a computing unit 620 and a control unit 660.

The computing unit 620 is the same as the pipeline computing apparatus of the above embodiment, and can set various pipelines internally.

The control unit 660 further includes a merger monitoring unit 665 and a correction coefficient calculating unit 666, in addition to the configuration of the control unit 160 of the pipeline computing apparatus 110.

The merger monitoring unit 665 receives at least the accumulated message numbers of the reception queues (reception queues 441 and 443 in FIG. 5) of the nodes immediately before the merger from the queue monitoring unit 562 and compares them. Then, as a result of the comparison, the degree of imbalance in the accumulated message number between the partial pipelines that merge is determined.

The correction coefficient calculating unit 666 receives information of a state of imbalance in the accumulated message number between the partial pipelines that merge from the merger monitoring unit 665. The correction coefficient calculating unit 666 calculates a correction coefficient K with respect to the nodes belonging to the partial pipeline in which the messages are accumulated, according to the degree of imbalance between the partial pipelines that merge.

For example, it is supposed that in a pipeline with a merger as shown in FIG. 5, the accumulated message number Qna of the reception queue 441 is three times the accumulated message number Qnb of the reception queue 443. In such a case, the correction coefficient calculating unit 666 sets the correction coefficient K=3 to the input node (A) 430 and the logic node (A) 440, which are the nodes of the partial pipeline to which the reception queue 441 belongs.

The time allocating unit 664 allocates the CPU time to each node according to the correction coefficient K calculated by the correction coefficient calculating unit 666 and the priority variable PRI calculated by the priority variable calculating unit 663 in the same manner as the priority variable calculating unit 163 of the pipeline computing apparatus 110. More specifically, for the node set with the correction coefficient, the CPU time corresponding to a value obtained by multiplying the priority variable PRI by the correction coefficient is allocated.

Then, the resources of CPU time are allocated by the nodes belonging to the partial pipeline in which the messages are accumulated, and the imbalance at the merger point is resolved.

As described above, according to the pipeline computing apparatus 610 of the fifth embodiment, pipeline processing can be reliably and efficiently executed as a whole even in a pipeline having a merger.

Sixth Embodiment

The pipeline computing apparatus according to the sixth embodiment is the same as each of the above embodiments, but is an example that has a different calculation formula for the priority variable PRI.

In the example of the above embodiments, the calculation formula executed by the priority variable calculating unit for calculating the priority variable is PRI=T×Q. In other words, the node processing time T and the accumulated message number Q have the same weights.

However, when the free capacity of the memory given to the computing unit becomes small, it may be preferable to weight the accumulated message number Q to operate in the direction of reducing temporarily accumulated messages.

In the pipeline computing apparatus according to the sixth embodiment, as an example, the calculation formula executed by the priority variable calculating unit for calculating the priority variable can be set to PRI=T×$Q^r$, (r≥1). Here, the variable r is a parameter for weighting the accumulated message number Q, and when it is larger than 1, it indicates that the accumulated message number Q is weighted. Nevertheless, the calculation formula that considers weighting is not limited to the above, and other calculation formulas may also be used.

In the pipeline computing apparatus according to the sixth embodiment, when the free capacity of the memory becomes small, the value of the variable r can be set larger than 1 to operate in the direction of reducing the accumulated message number Q, and a situation of insufficient memory resources can be prevented.

Further, in the pipeline computing apparatus according to the sixth embodiment, as an example, the calculation formula executed by the priority variable calculating unit for calculating the priority variable can be set to PRI=T×$Q^{(Q/Q_{max}+m)}$, directly considering a usage rate m of the memory given to the computing unit. Here, Qmax is the maximum value of the number of messages that can be accumulated in the reception queue. This calculation formula can also prevent a situation of insufficient memory resources.

Seventh Embodiment

The pipeline computing apparatus according to the seventh embodiment is the same as each of the above embodiments, but is an example further including a special process performed in a specific situation.

Figure 7:
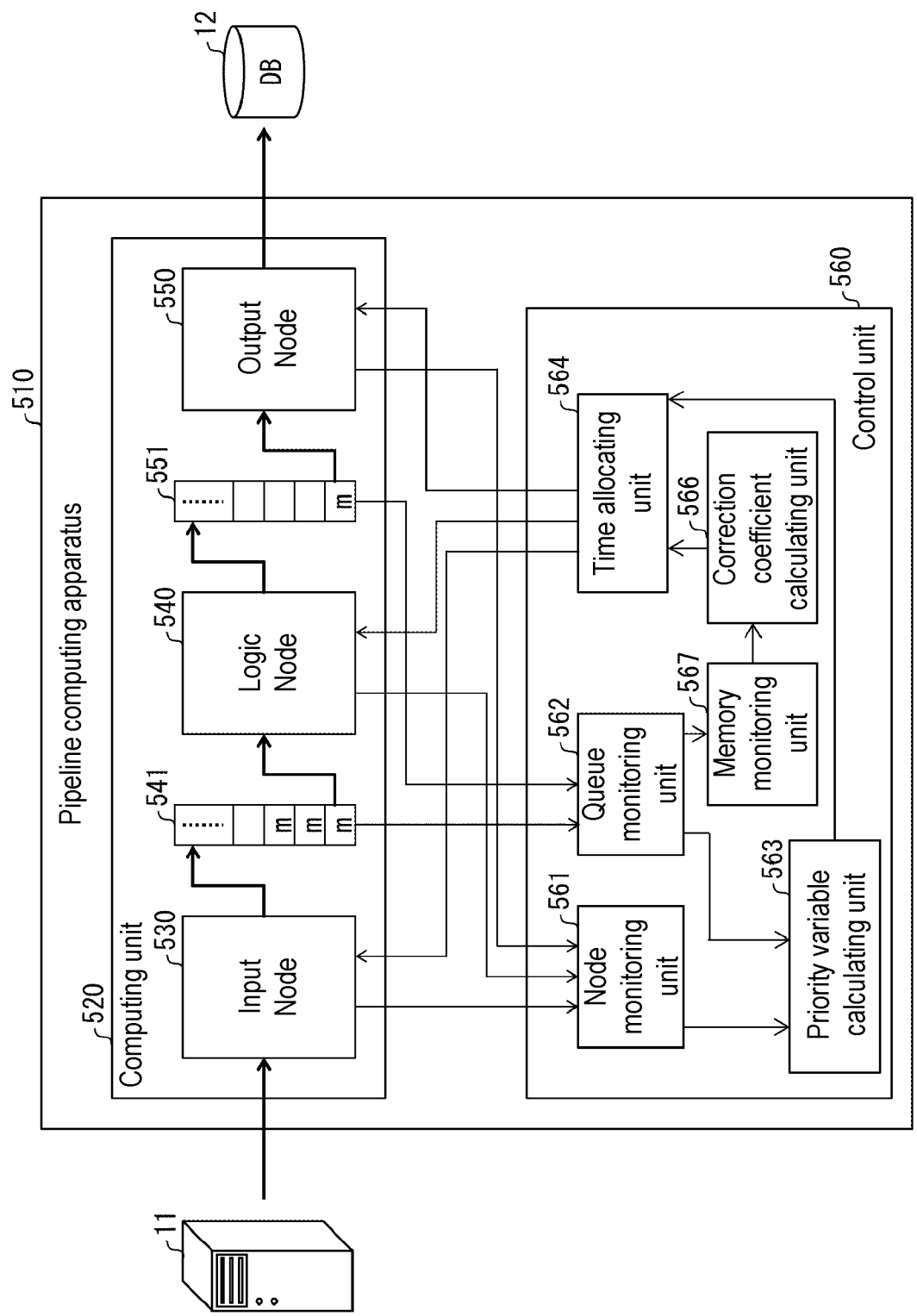
FIG. 7 is a schematic configuration diagram showing a pipeline computing apparatus according to the seventh embodiment of the invention.

FIG. 7 is a schematic diagram showing a configuration of a pipeline computing apparatus 510 according to the seventh embodiment.

The pipeline computing apparatus 510 includes a computing unit 520 and a control unit 560.

The computing unit 520 is the same as the pipeline computing apparatus of the above embodiment, and can set various pipelines internally. An example of the pipelines to be set will be described later. To avoid complications, only one pipeline is shown in FIG. 7.

The control unit 560 further includes a memory monitoring unit 567 and a correction coefficient calculating unit 566, in addition to the configuration of the control unit 160 of the pipeline computing apparatus 110.

The memory monitoring unit 567 receives the accumulated message number of each node from the queue monitoring unit 562, and totals them. Then, it is determined whether the free capacity is smaller than a predetermined value as compared with the allocation of the memory resources secured for the reception queue of the pipeline computing apparatus 510. When the free capacity becomes smaller than the predetermined value, the memory monitoring unit 567 sends a notification indicating the same to the correction coefficient calculating unit 566.

When the correction coefficient calculating unit 566 receives the notification from the memory monitoring unit 567, the correction coefficient calculating unit 566 sets the correction coefficient K with respect to the nodes belonging to a specific pipeline. The correction coefficient K may be a specified value (for example, K=2) or a value according to the ratio of usage of the memory.

The time allocating unit 564 allocates the CPU time to each node according to the correction coefficient K calculated by the correction coefficient calculating unit 566 and the priority variable PRI calculated by the priority variable calculating unit 563 in the same manner as the priority variable calculating unit 163 of the pipeline computing apparatus 110. More specifically, for the node set with the correction coefficient, the CPU time corresponding to a value obtained by multiplying the priority variable PRI by the correction coefficient K is allocated.

Figure 8:
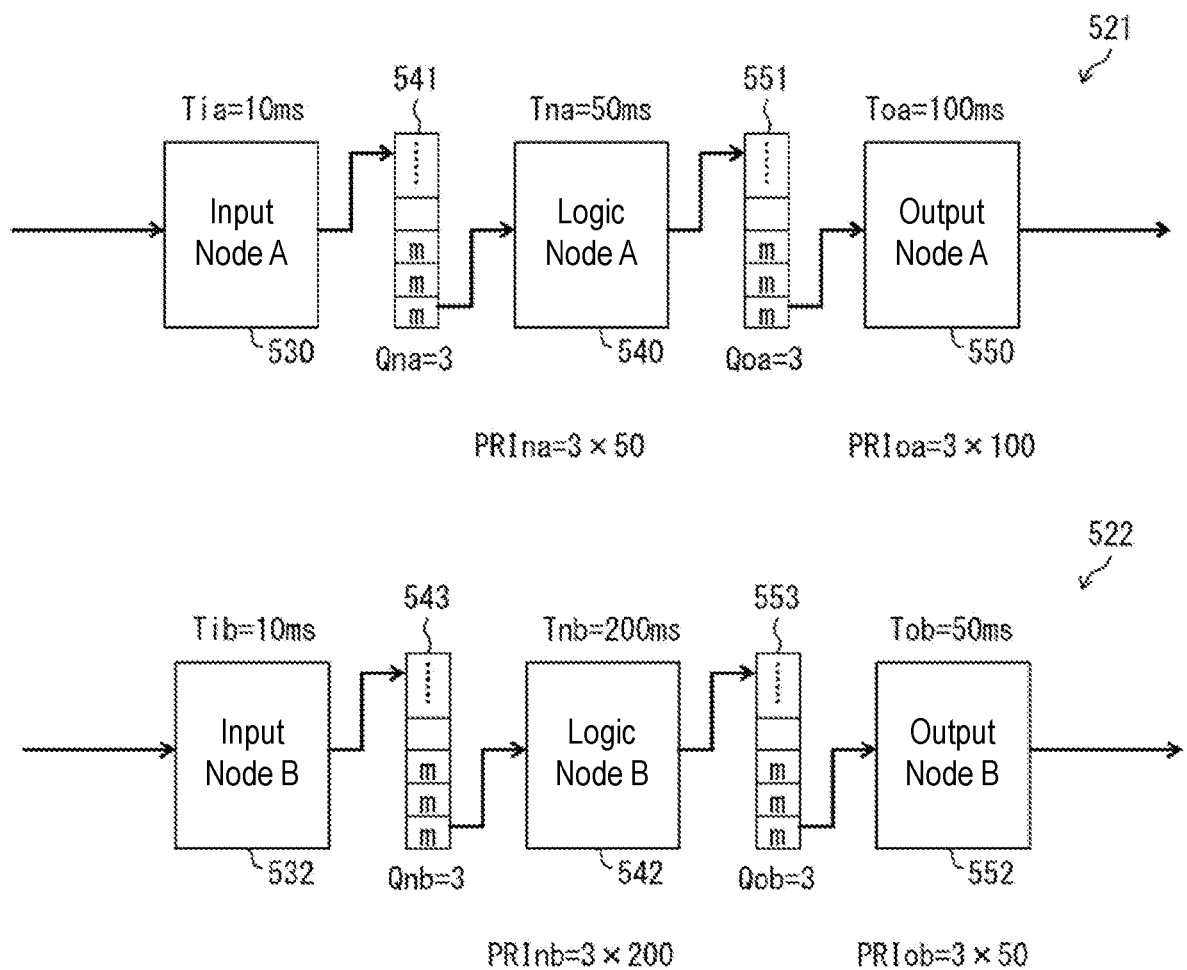
FIG. 8 is a diagram for illustrating a configuration and an operation of a pipeline in the pipeline computing apparatus according to the seventh embodiment of the invention.

FIG. 8 is a diagram showing a pipeline (A) 521 and a pipeline (B) 522 in the computing unit of the pipeline computing apparatus 510 according to the seventh embodiment.

The subscripts ia, na, and oa for the node processing time T, the accumulated message number Q of the reception queue, and the priority variable PRI respectively represent the input node (A) 530, the logic node (A) 540 or its reception queue (A) 541, and the output node (A) 550 or its reception queue (A) 551.

Similarly, the subscripts ib, nb, and ob respectively represent the input node (B) 532, the logic node (B) 542 or its reception queue (B) 543, and the output node (B) 552 or its reception queue (B) 553.

The input node (A) 530, the reception queue (A) 541, the logic node (A) 540, the reception queue (A) 551, and the output node (A) 550 are sequentially connected to the pipeline (A) 521. The node processing times of the input node (A) 530, the logic node (A) 540, and the output node (A) 550 are Tia=10 ms, Tna=50 ms, and Toa=100 ms, respectively.

The input node (B) 532, the reception queue (B) 543, the logic node (B) 542, the reception queue (B) 553, and the output node (B) 552 are sequentially connected to the pipeline (B) 522. The node processing times of the input node (B) 532, the logic node (B) 542, and the output node (B) 552 are Tib=10 ms, Tnb=200 ms, and Toa=50 ms, respectively.

In the above configuration, when the free capacity of the given memory becomes small and a notification is received from the memory monitoring unit 567, the correction coefficient calculating unit 566 gives the correction coefficient K (for example, K=2) to each node belonging to the pipeline 521.

The pipeline given the correction coefficient is selected from the one that takes the shortest time to complete the pipeline. In the example of FIG. 8, the time of the pipeline 521 is Tia+Tna+Toa, which is 160 ms. The time of the pipeline 522 is Tib+Tnb+Tob, which is 260 ms. Therefore, in the example of FIG. 8, the pipeline 521 is selected.

The pipeline selected by the correction coefficient calculating unit 566 may be determined in advance by a program that constructs the pipeline computing apparatus 510 based on an approximate value of the processing time of each pipeline. Alternatively, it may be sequentially calculated based on the node processing time T of each node acquired by the node monitoring unit 561.

In this way, when the CPU time is preferentially allocated to the predetermined pipeline 521 which takes a short time to complete the pipeline, the processing of the messages in the pipeline 521 progresses rapidly, and the free capacity of the memory increases.

In FIG. 8, Qna=3, Qoa=3, PRIna=3×50, PRIoa=3×100, Qnb=3, Qob=3, PRInb=3×200, and PRIob=3×50.

As described above, in the pipeline computing apparatus 510 according to the seventh embodiment, when the free capacity of the memory given to the computing unit becomes small, the time allocating unit 564 increases the allocation of the operating time of the nodes belonging to the pipeline that takes a short time to complete the pipeline, and the messages in the computing unit 520 are promptly reduced.

In the pipeline computing apparatus 510 according to the seventh embodiment, when the free capacity of the memory becomes small, the control unit 560 can perform the above-mentioned special processing to reduce the messages staying in the computing unit 520, and a situation of insufficient memory resources can be prevented.

In the seventh embodiment, an example in which a plurality of pipelines having no branch are provided is described. On the other hand, in a pipeline having a branch as shown in FIG. 4, for example, the messages in the pipeline are rapidly increased by the branch. Therefore, when the free capacity of the memory becomes small, the same operation as described above is also effective to relatively reduce the allocation of the operating time of the pipeline having such a branch and recover the free capacity of the memory.

Eighth Embodiment

A pipeline computing apparatus 710 according to the eighth embodiment is the same as each of the above embodiments, but is an example that generates the node processing time for calculating the priority variable PRI of the node based on statistical values of a plurality of node processing times T from the past of the node acquired by the node monitoring unit.

Figure 9:
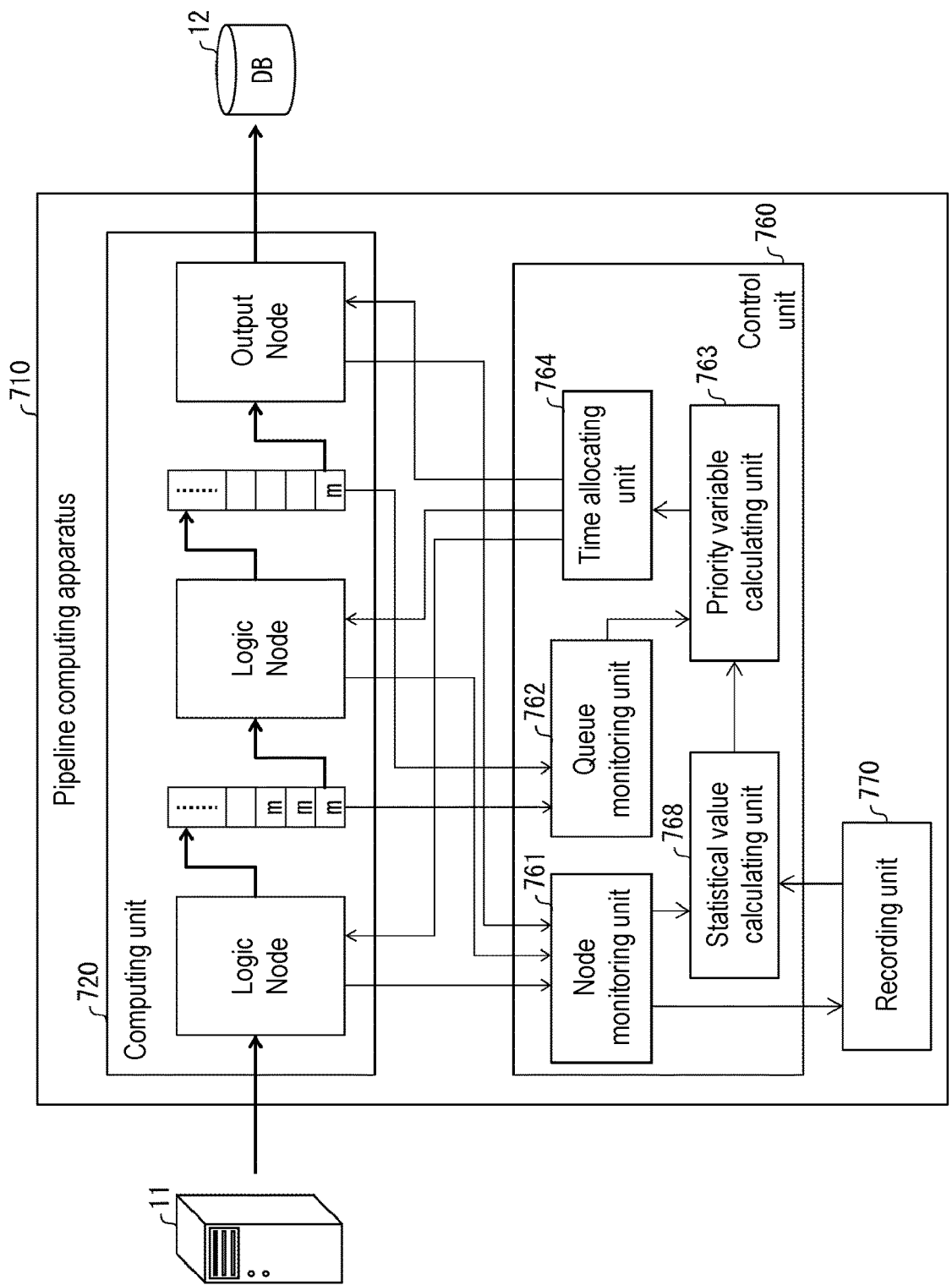
FIG. 9 is a schematic configuration diagram showing a pipeline computing apparatus according to the eighth embodiment of the invention.

FIG. 9 is a schematic diagram showing a configuration of a pipeline computing apparatus 710 according to the eighth embodiment.

The pipeline computing apparatus 710 includes a computing unit 720, a control unit 760, and a recording unit 770.

The computing unit 720 is the same as the pipeline computing apparatus of the above embodiment, and can set various pipelines internally.

The control unit 760 further includes a statistical value calculating unit 768, in addition to the configuration of the control unit 160 of the pipeline computing apparatus 110.

The node monitoring unit 761 records the node processing time T acquired from each node of the computing unit 720 in the recording unit 770.

The statistical value calculating unit 768 calculates the statistical value of the node processing time based on the node processing time T of each node in the past recorded in the recording unit 770 and the latest node processing time T acquired by the node monitoring unit 761. The average value, the median value, or the mode value can be used as the statistical value. Alternatively, the latest node processing time T which excludes outliers may also be used by using a method such as the Smirnov Grabs test. The priority variable calculating unit 763 calculates the priority variable PRI in the same manner as the priority variable calculating unit 163 of the pipeline computing apparatus 110, except that the statistical value calculated by the statistical value calculating unit 768 is used for the node processing time.

The operation of the time allocating unit 764 is the same as the operation of the time allocating unit 164 of the pipeline computing apparatus 110.

According to the pipeline computing apparatus 710 of the eighth embodiment, since the statistical value is used as the node processing time for calculating the priority variable PRI, it is possible to prevent allocating an extreme operating time in each node due to a sudden reason.

[Additional Notes]

In the above embodiments, the accumulated message number Q, which is the number of accumulated messages, is used as the accumulated message amount of the reception queue.

However, the application of the invention is not limited thereto, and the total size of the messages accumulated in the reception queue (usage amount of the memory) may be used as the accumulated message amount. In this case, the priority variable PRI can be calculated by a product obtained by multiplying the total size of the accumulated messages by the node processing time T.

Further, in the above embodiments, the above-mentioned specific example is described as the priority variable PRI. However, the application of the invention is not limited thereto. The priority variable PRI may be calculated by multiplying a coefficient corresponding to an index that is considered to be useful in calculating the message processing priority, such as its importance, for each message and using the sum thereof.

In addition, in the pipeline computing apparatus of the invention, all the nodes in the computing unit are not necessarily controlled by the control unit 160 of the invention, and some nodes may be controlled by other methods.

[Example Realized by Software]

The functional blocks (in particular, input node, logic node, output node, reception queue, node monitoring unit, queue monitoring unit, priority variable calculating unit, time allocating unit, merger monitoring unit, correction coefficient calculating unit, memory monitoring unit, and statistical value calculating unit) of the pipeline computing apparatuses 110, 210, 510, 610, and 710 may be realized by a logic circuit (hardware) formed in an integrated circuit (IC chip) or the like, or may be realized by software.

In the latter case, the pipeline computing apparatuses 110, 210, 510, 610, and 710 include a computer that executes commands of a program that is software for realizing each function. The computer includes, for example, one or more processors and a computer-readable recording medium that stores the program. Then, in the computer, the processor reads the program from the recording medium and executes the program, thereby achieving the invention.

For example, a CPU (Central Processing Unit) can be used as the above-mentioned processor. A "non-temporary tangible medium", for example, a tape, a disk, a card, a semiconductor memory, a programmable logic circuit or the like in addition to a ROM (Read Only Memory), can be used as the above-mentioned recording medium.

Further, a RAM (Random Access Memory) for developing the above-mentioned program may be further provided.

Further, the above-mentioned program may be supplied to the computer via an arbitrary transmission medium (communication network, broadcast wave, etc.) capable of transmitting the program.

One aspect of the invention can also be realized in the form of a data signal embedded in a carrier wave, in which the above-mentioned program is embodied by electronic transmission.

[Summary]

A pipeline computing apparatus according to one aspect of the invention includes: a computing unit including a plurality of nodes and a plurality of reception queues, and the computing unit being composed of at least one of pipelines in which a plurality of the nodes are connected via the reception queues; and a control unit including a node monitoring unit, a queue monitoring unit, a priority variable calculating unit, and a time allocating unit. The node monitoring unit acquires a node processing time, which is a time required to process one message in the node, from the node. The queue monitoring unit acquires an accumulated message amount to the reception queue from the reception queue. The priority variable calculating unit calculates a priority variable of the node based on at least the node processing time of the node and the accumulated message amount of the reception queue in a stage previous to the node. The time allocating unit allocates an operating time to each node according to the priority variable for each node.

According to the above configuration, an improved pipeline computing apparatus is realized, which can efficiently execute pipeline processing as a whole while preventing overflow of the reception queue.

In the pipeline computing apparatus according to the above one aspect, the accumulated message amount may be a number of messages accumulated in the reception queue or a total size of the accumulated messages.

According to the above configuration, the priority variable for the pipeline processing to be executed efficiently as a whole can be specifically calculated.

In the pipeline computing apparatus according to the above one aspect, the priority variable calculating unit may calculate a product of the node processing time of the node and the accumulated message amount as the priority variable of the node.

According to the above configuration, it is possible to prevent a situation in which the node waits for message input and enters an operation idle state, and prevent the efficiency of the operation of the entire pipeline from deteriorating.

In the pipeline computing apparatus according to the above one aspect, the priority variable calculating unit may generate the node processing time for calculating the priority variable of the node based on a plurality of the node processing times from a past of the node acquired by the node monitoring unit.

According to the above configuration, it is possible to prevent allocating an extreme operating time in each node due to a sudden reason.

In the pipeline computing apparatus according to the above one aspect, the computing unit may further include a merger monitoring unit and a correction coefficient calculating unit. For a pipeline in which a plurality of partial pipelines merge among the pipelines, the merger monitoring unit acquires from the queue monitoring unit accumulated message amounts of reception queues in a stage previous to nodes belonging to different partial pipelines upstream of a node at a merger point of the plurality of partial pipelines, and calculates a degree of imbalance in the accumulated message amounts of the reception queues in the stage previous to the nodes belonging to the different partial pipelines. The correction coefficient calculating unit calculates a correction coefficient according to the degree of imbalance for the node belonging to any of the partial pipelines among the different partial pipelines. When the correction coefficient is calculated for the node, the time allocating unit allocates the operating time according to a value obtained by multiplying the priority variable by the correction coefficient.

According to the above configuration, pipeline processing can be reliably and efficiently executed as a whole even in a pipeline having a merger.

In the pipeline computing apparatus according to the above one aspect, the computing unit may further include a memory monitoring unit and a correction coefficient calculating unit. When a free capacity of a memory that stores accumulated messages of the reception queue becomes smaller than a predetermined value, the memory monitoring unit sends a notification to the correction coefficient calculating unit. When receiving the notification, the correction coefficient calculating unit gives a correction coefficient larger than 1 for a node belonging to a pipeline that has a shorter time to complete processing of messages in the pipeline or has fewer branches among the plurality of pipelines. When the correction coefficient is given to the node, the time allocating unit allocates the operating time according to a value obtained by multiplying the priority variable by the correction coefficient.

According to the above configuration, when the free capacity of the memory becomes small, the messages staying in the computing unit can be reduced, and a situation of insufficient memory resources can be prevented.

A programmable logic controller according to one aspect of the invention may include the pipeline computing apparatus according to the above one aspect.

According to the above configuration, it is easy for the user to construct an FA system that has a high-performance data collection function and reflects the result of analyzing the collected data for control of various control target devices.

A pipeline processing execution method according to one aspect of the invention is a method for executing pipeline processing by at least one pipeline in which a plurality of nodes are connected via a plurality of reception queues. The pipeline processing execution method includes: a step of acquiring a node processing time, which is a time required to process one message in the node; a step of acquiring an accumulated message amount to the reception queue; a step of calculating a priority variable of the node based on at least the node processing time of the node and the accumulated message amount of the reception queue in a stage previous to the node; and a step of allocating an operating time to each node according to the priority variable for each node.

According to the above configuration, improved pipeline computation processing can be realized, which can efficiently execute pipeline processing as a whole while preventing overflow of the reception queue.

The invention is not limited to the above-described embodiments, and various modifications can be made within the scope of the claims. The technical scope of the invention also includes embodiments obtained by appropriately combining the technical means disclosed in different embodiments.

What is claimed is:

1. A pipeline computing apparatus, comprising:
a computing circuit comprising a plurality of nodes and a plurality of reception queues, and the computing circuit being composed of at least one of pipelines in which a plurality of the nodes are connected via the reception queues; and
a control circuit comprising a node monitoring circuit, a queue monitoring circuit, a priority variable calculating circuit, and a time allocating circuit,
wherein the node monitoring circuit acquires a node processing time, which is a time required to process one message in the node, from the node,
the queue monitoring circuit acquires an accumulated message amount of the reception queue from the reception queue,
the priority variable calculating circuit calculates a priority variable of the node based on at least the node processing time of the node and the accumulated message amount of the reception queue in a stage previous to the node, and the time allocating circuit allocates an operating time to each node according to the priority variable for each node.

2. The pipeline computing apparatus according to claim 1, wherein the accumulated message amount is a number of messages accumulated in the reception queue or a total size of the accumulated messages.

3. The pipeline computing apparatus according to claim 2, wherein the priority variable calculating circuit calculates a product of the node processing time of the node and the accumulated message amount as the priority variable of the node.

4. The pipeline computing apparatus according to claim 2, wherein the priority variable calculating circuit generates the node processing time for calculating the priority variable of the node based on a plurality of previous node processing times of the node acquired by the node monitoring circuit.

5. The pipeline computing apparatus according to claim 2, wherein the computing circuit further comprises a merger monitoring circuit and a correction coefficient calculating circuit, for a pipeline in which a plurality of partial pipelines merge among the pipelines, the merger monitoring circuit acquires from the queue monitoring circuit accumulated message amounts of reception queues in a stage previous to nodes belonging to different partial pipelines upstream of a node at a merger point of the plurality of partial pipelines, and calculates a determination of imbalance in the accumulated message amounts of the reception queues in the stage previous to the nodes belonging to the different partial pipelines, the correction coefficient calculating circuit calculates a correction coefficient according to the determination of imbalance for the node belonging to any of the partial pipelines among the different partial pipelines, and when the correction coefficient is calculated for the node, the time allocating circuit allocates the operating time according to a value obtained by multiplying the priority variable by the correction coefficient.

6. The pipeline computing apparatus according to claim 2, wherein the computing circuit further comprises a memory monitoring circuit and a correction coefficient calculating circuit, when a free capacity of a memory that stores accumulated messages of the reception queue becomes smaller than a predetermined value, the memory monitoring circuit sends a notification to the correction coefficient calculating circuit, when receiving the notification, the correction coefficient calculating circuit gives a correction coefficient larger than 1 for a node belonging to a pipeline that has a shorter time to complete processing of messages in the pipeline or has fewer branches among the plurality of pipelines, and when the correction coefficient is given to the node, the time allocating circuit allocates the operating time according to a value obtained by multiplying the priority variable by the correction coefficient.

7. The pipeline computing apparatus according to claim 1, wherein the priority variable calculating circuit calculates a product of the node processing time of the node and the accumulated message amount as the priority variable of the node.

8. The pipeline computing apparatus according to claim 7, wherein the priority variable calculating circuit generates the node processing time for calculating the priority variable of the node based on a plurality of previous node processing times of the node acquired by the node monitoring circuit.

9. The pipeline computing apparatus according to claim 7, wherein the computing circuit further comprises a merger monitoring circuit and a correction coefficient calculating circuit, for a pipeline in which a plurality of partial pipelines merge among the pipelines, the merger monitoring circuit acquires from the queue monitoring circuit accumulated message amounts of reception queues in a stage previous to nodes belonging to different partial pipelines upstream of a node at a merger point of the plurality of partial pipelines, and calculates a determination of imbalance in the accumulated message amounts of the reception queues in the stage previous to the nodes belonging to the different partial pipelines, the correction coefficient calculating circuit calculates a correction coefficient according to the determination of imbalance for the node belonging to any of the partial pipelines among the different partial pipelines, and when the correction coefficient is calculated for the node, the time allocating circuit allocates the operating time according to a value obtained by multiplying the priority variable by the correction coefficient.

10. The pipeline computing apparatus according to claim 7, wherein the computing circuit further comprises a memory monitoring circuit and a correction coefficient calculating circuit, when a free capacity of a memory that stores accumulated messages of the reception queue becomes smaller than a predetermined value, the memory monitoring circuit sends a notification to the correction coefficient calculating circuit, when receiving the notification, the correction coefficient calculating circuit gives a correction coefficient larger than 1 for a node belonging to a pipeline that has a shorter time to complete processing of messages in the pipeline or has fewer branches among the plurality of pipelines, and when the correction coefficient is given to the node, the time allocating circuit allocates the operating time according to a value obtained by multiplying the priority variable by the correction coefficient.

11. The pipeline computing apparatus according to claim 1, wherein the priority variable calculating circuit generates the node processing time for calculating the priority variable of the node based on a plurality of previous node processing times of the node acquired by the node monitoring circuit.

12. The pipeline computing apparatus according to claim 11, wherein the computing circuit further comprises a merger monitoring circuit and a correction coefficient calculating circuit, for a pipeline in which a plurality of partial pipelines merge among the pipelines, the merger monitoring circuit acquires from the queue monitoring circuit accumulated message amounts of reception queues in a stage previous to nodes belonging to different partial pipelines upstream of a node at a merger point of the plurality of partial pipelines, and calculates a determination of imbalance in the accumulated message amounts of the reception queues in the stage previous to the nodes belonging to the different partial pipelines, the correction coefficient calculating circuit calculates a correction coefficient according to the determination of imbalance for the node belonging to any of the partial pipelines among the different partial pipelines, and when the correction coefficient is calculated for the node, the time allocating circuit allocates the operating time according to a value obtained by multiplying the priority variable by the correction coefficient.

13. The pipeline computing apparatus according to claim 11, wherein the computing circuit further comprises a memory monitoring circuit and a correction coefficient calculating circuit, when a free capacity of a memory that stores accumulated messages of the reception queue becomes smaller than a predetermined value, the memory monitoring circuit sends a notification to the correction coefficient calculating circuit, when receiving the notification, the correction coefficient calculating circuit gives a correction coefficient larger than 1 for a node belonging to a pipeline that has a shorter time to complete processing of messages in the pipeline or has fewer branches among the plurality of pipelines, and when the correction coefficient is given to the node, the time allocating circuit allocates the operating time according to a value obtained by multiplying the priority variable by the correction coefficient.

14. The pipeline computing apparatus according to claim 1, wherein the computing circuit further comprises a merger monitoring circuit and a correction coefficient calculating circuit, for a pipeline in which a plurality of partial pipelines merge among the pipelines, the merger monitoring circuit acquires from the queue monitoring circuit accumulated message amounts of reception queues in a stage previous to nodes belonging to different partial pipelines upstream of a node at a merger point of the plurality of partial pipelines, and calculates a determination of imbalance in the accumulated message amounts of the reception queues in the stage previous to the nodes belonging to the different partial pipelines, the correction coefficient calculating circuit calculates a correction coefficient according to the determination of imbalance for the node belonging to any of the partial pipelines among the different partial pipelines, and when the correction coefficient is calculated for the node, the time allocating circuit allocates the operating time according to a value obtained by multiplying the priority variable by the correction coefficient.

15. The pipeline computing apparatus according to claim 1, wherein the computing circuit further comprises a memory monitoring circuit and a correction coefficient calculating circuit, when a free capacity of a memory that stores accumulated messages of the reception queue becomes smaller than a predetermined value, the memory monitoring circuit sends a notification to the correction coefficient calculating circuit, when receiving the notification, the correction coefficient calculating circuit gives a correction coefficient larger than 1 for a node belonging to a pipeline that has a shorter time to complete processing of messages in the pipeline or has fewer branches among the plurality of pipelines, and when the correction coefficient is given to the node, the time allocating circuit allocates the operating time according to a value obtained by multiplying the priority variable by the correction coefficient.

16. A programmable logic controller comprising the pipeline computing apparatus according to claim 1.

17. A pipeline processing execution method for executing pipeline processing by at least one pipeline in which a plurality of nodes are connected via a plurality of reception queues, the pipeline processing execution method comprising:

a step of acquiring a node processing time, which is a time required to process one message in the node;

a step of acquiring an accumulated message amount of the reception queue;

a step of calculating a priority variable of the node based on at least the node processing time of the node and the accumulated message amount of the reception queue in a stage previous to the node; and a step of allocating an operating time to each node according to the priority variable for each node.

* * * * *